United States Patent [19]

Hafner et al.

[11] Patent Number: 4,597,558

[45] Date of Patent: Jul. 1, 1986

[54] ELECTROMAGNETICALLY ACTUATABLE VALVE

[75] Inventors: Udo Hafner, Lorch; Heinrich Knapp, Leonberg, both of Fed. Rep. of Germany

[73] Assignee: Robert Bosch GmbH, Stuttgart, Fed. Rep. of Germany

[21] Appl. No.: 723,230

[22] Filed: Apr. 15, 1985

[30] Foreign Application Priority Data

Jul. 26, 1984 [DE] Fed. Rep. of Germany ....... 3427526

[51] Int. Cl.[4] .............................................. F16K 31/06

[52] U.S. Cl. ................................ 251/129.15; 251/86; 251/129.05; 239/585

[58] Field of Search ............... 251/129, 138, 139, 141, 251/86, 129.01, 129.05, 129.15; 239/585

[56] References Cited

U.S. PATENT DOCUMENTS

| | | | |
|---|---|---|---|
| 1,273,304 | 7/1918 | Yates | 251/86 |
| 1,832,341 | 11/1931 | Williamson | 251/86 |
| 3,231,144 | 1/1966 | Rouanet et al. | 251/86 |
| 4,142,683 | 3/1979 | Casey et al. | 251/138 |
| 4,477,027 | 10/1984 | Knapp et al. | 251/139 |

*Primary Examiner*—Samuel Scott
*Assistant Examiner*—Noah Kamen
*Attorney, Agent, or Firm*—Edwin E. Greigg

[57] ABSTRACT

An electromagnetically actuatable valve is proposed, which serves in particular to inject fuel into the intake tube of internal combustion engines having fuel injection systems. The fuel injection valve includes a valve housing, a core having a magnetic coil and an armature, which is guided by a guide diaphragm and is firmly connected to a bearing tube. Protruding into the bearing tube is a spherical pivot segment of a valve member, which is on the one hand partially surrounded and engaged by a pan-shaped segment of the bearing tube and on the other hand is axially fixed by means of a retainer ring. Joined to the pivot segment is an elongation segment, on the other end of which a spherical sealing segment is secured, and which is further radially guided by means of a guide ring and thereby cooperates with a valve seat in a nozzle body. Since the pivot segment is pivotably supported in the bearing tube, shear forces at the armature have no effect on the sealing segment.

3 Claims, 1 Drawing Figure

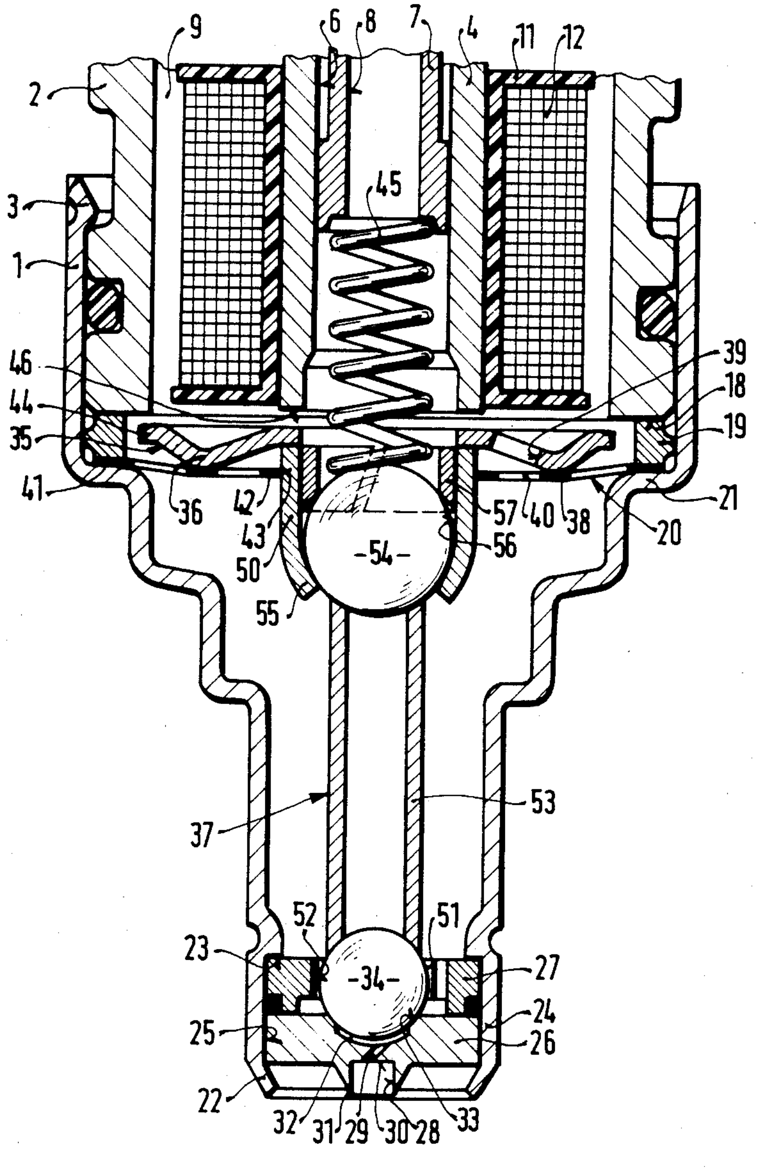
9
6
8
7
4
11
12
2
45
3
1
46
44
35
41
39
18
19
21
20
36
42
43
50
55
57
40
38
56
-54-
37
53
52
51
23
27
-34-
24
25
26
22
32
31
29
30
28
33

ELECTROMAGNETICALLY ACTUATABLE VALVE

BACKGROUND OF THE INVENTION

The invention is based on an electromagnetically actuatable valve as generically defined hereinafter. An electromagnetically actuatable valve is already known which, in order to overcome problems in installation resulting from a lack of space in the vicinity of individual engine cylinders, has an elongated, narrow mouth area in which a valve element firmly joined to the armature is disposed. The firm connection between the armature and the elongated valve element has the disadvantage, however, that at the slightest radial displacement of the armature, undesirably strong lateral forces arise at the sealing segment of the valve member, causing undesirable wear and undesirable changes in the ejection characteristic of the valve.

OBJECT AND SUMMARY OF THE INVENTION

The valve according to the invention has the advantage over the prior art that the valve member is supported with little friction and that lateral forces are avoided during radial displacements of the armature; as a result, the end of the valve in the vicinity of the valve seat and valve member can be slender in embodiment and requires little installation space in the radial direction, thereby making it possible, when the valve is used as a fuel injection valve, for the fuel to be injected at the desired location in the intake tube.

The invention will be better understood and further objects and advantages thereof will become more apparent from the ensuing detailed description of a preferred embodiment taken in conjunction with the drawing.

BRIEF DESCRIPTION OF THE DRAWING

The single FIGURE of the drawing shows a cross sectional view of an exemplary embodiment of the invention in simplified form.

DESCRIPTION OF THE PREFERRED EMBODIMENTS

The fuel injection valve for a fuel injection system, shown in the drawing as an example of a valve, serves for instance to inject fuel into the intake tube of mixture-compressing internal combustion engines having externally supplied ignition. A first valve housing part 1 and a second valve housing part 2 are manufactured by a chip-free process such as deep drawing, rolling or the like. The valve housing parts 1, 2 partially overlap one another and are joined together and axially clamped in a known manner, for instance by means of crimping 3. A fuel pipe 4 embodied as a connecting piece is sealingly inserted into the valve housing part 2; it is embodied of ferromagnetic material and simultaneously acts as the inner core of the electromagnetically actuatable valve. This fuel pipe 4 which extends concentrically relative to the longitudinal axis of the valve has an inner bore 6, into which an adjusting sleeve 7 having a through bore 8 is pressed. The end of the fuel pipe 4 which protrudes out of the valve housing part 2 communicates with a fuel source, for instance a fuel distributor line. The other end of the fuel pipe 4 protrudes into an interior chamber 9 of the valve and has an insulating carrier body 11, which at least partially surrounds a magnetic coil 12. A spacer ring 19 rests against the end face 18 of the valve housing part 2 and is adjoined by a guide diaphragm 20. The other side of the guide diaphragm 20 is engaged by a collar 21 of the first valve housing part 1, thereby producing an axial clamping force for the positional fixation of the spacer ring 19 and the guide diaphragm 20. The valve housing part 1 has on its end 24 a coaxial receiving bore 25, in which a nozzle body 26 and a guide ring 27 are inserted and secured, for instance by crimping the end 24 about the nozzle body 26. Remote from the nozzle body 26, the guide ring 27 rests on an inwardly extending step 23 of the first valve housing part 1, which with a crimped area 22 surrounds and grips the nozzle body 26 and with the guide ring 27 exerts axial tension on these elements. The nozzle body 26 has a preparation bore 28 embodied in the form of a blind bore, at the bottom 30 of which at least one fuel guide bore 29, serving to meter fuel, discharges. The fuel guide bore 29 preferably discharges in such a manner at the bottom 30 of the preparation bore 28 that no tangentially directed inflow into the preparation bore 28 takes place, but that instead the fuel steam initially emerges from the fuel guide bores 29 without touching the wall and subsequently strikes the wall of the preparation bore 28, after which it is distributed over the wall, extending toward the nozzle body end 31, in the form of a film approximately in the shape of a parabola. The fuel guide bores 29 are inclined with respect to the longitudinal axis of the valve and then begin at a spherical chamber 32 embodied in the nozzle body, downstream of which chamber 32 a curved valve seat 33 is embodied, with which a spherically embodied sealing segment 34 of a movable valve member 37 cooperates. To attain the smallest possible idle volume, the volume of the spherical chamber 32 should be as small as possible when the sealing segment 34 is resting on the valve seat.

Between the magnetic coil 12 and the guide diaphragm 20, there is a flat armature 35. The flat armature 35 may be embodied as a stamped or extruded part having a plurality of passages 39 and may for instance have an annular guide ring 36, which is embodied in a raised manner and rests on an annular guide zone 38 of the guide diaphragm 20, on that side of the guide diaphragm 20 which is remote from the valve seat 33. Flowthrough openings 40 in the guide diaphragm 20 enable an unhindered flow of fuel around the flat armature 35 and the guide diaphragm 20. The guide diaphragm 20, fastened at its outer circumference on an end clamping zone 41 between the spacer ring 19 and the collar 21, has a centering zone 42, which surrounds a centering opening 43, through which a bearing tube 50, firmly joined to the flat armature 35, projects with little play and is centered in the radial direction with respect to the longitudinal axis of the valve. By means of the guide zone 38 of the guide diaphragm 20 that engages the guide ring 36 of the flat armature 35, the flat armature 35 is guided as parallel as possible with respect to the end face 18 of the valve housing part 2, beyond which it partially protrudes with an outer operative zone 44. A compression spring 45 is guided in the inner bore 6 of the fuel pipe 4, which extends to near the flat armature 35. At one end this compression spring 45 engages the valve member 37 or the flat armature 35 and on the other end it engages the adjusting sleeve 7 and has the tendency of urging the valve member 37 toward the valve seat 33. The fuel pipe 4, embodied as an inner core, is in particular inserted so far into the valve housing part 2 that between its end face 46 oriented toward the flat armature 35 and the flat armature 35 itself, a small air gap still exists if, with the magnetic coil 12 excited, the flat armature 35 is drawn with its outer operative zone 44 against the end face 18 of the valve housing part 2, while when the magnetic coil 12 is not excited the flat armature 35 is urged toward the valve seat 33 by the compression spring 45. The magnetic circuit extends on the outside via the valve housing part 2 and on the inside via the fuel pipe 4 and is completed via the flat armature 35.

The spherical sealing segment 34 of the valve member 37 protrudes into a guide opening 51 of the guide ring 27 and is guided in the radial direction by guide faces 52 of the guide opening 51 of the guide ring 27. At least three guide faces 52 are provided, which are spaced apart approximately uniformly from one another. The axial fuel fuel flow is effected between the individual guide faces 52. A cylindrical elongating section 53 is connected to the sealing segment 34, for instance by welding or soldering, and may be embodied as a tube. The valve member 37 further has a spherical pivot segment 54, which is joined to the elongating section 53 remote from the sealing segment 34. The pivot segment 54 of the valve member 37 protrudes into the bearing tube 50, acting as a retaining means, on the flat armature 35 and is partially surrounded surrounded and gripped by an inwardly extending, pan-shaped segment 55 of the bearing tube 50. For axially securing the position of the pivot segment 54, a retaining ring 57 is disposed in the inner bore 56 of the bearing tube 50, remote from the segment 55. The retaining ring 57 may for example be embodied as a slit spring ring and it assures a bearing of the pivot segment 54 of the valve member 37 with the pan-shaped segment 55 of the bearing tube 50 in as play-free a manner as possible, yet permits a virtually friction-free pivoting movement of the pivot segment 54 in the pan-shaped segment 55 of the bearing tube 50. Because it is possible for the valve member 37 to pivot outward at the pivot segment 54 with respect to the flat armature 35, any shear forces deriving from the flat armature are no longer transmitted to the valve member 37, and the sealing segment 34 of the valve member 37 can be guided in the guide ring 27 without shear forces.

The foregoing relates to a preferred exemplary embodiment of the invention, it being understood that other variants and embodiments thereof are possible within the spirit and scope of the invention, the latter being defined by the appended claims.

What is claimed and desired to be secured by Letters Patent of the United States is:

1. An electromagnetically actuatable valve for fuel injection systems of internal combustion engines, comprising a valve housing; a core, a magnetic winding, and an armature in said valve housing with said armature coupled with a valve member, said armature is substantially flat and includes an annular guide ring, said valve member including a cylindrical elongation segment fixed to a spherical sealing segment arranged to cooperate with a fixed valve seat, a valve guide ring juxtaposed said valve member and supported in said valve housing, said spherical sealing segment adapted to protrude into a guide opening of said guide ring and guided by said guide opening coaxially with said valve seat, said armature including a central aperture, a bearing tube retainer affixed to said armature to surround said central aperature, a guide diaphragm secured along its outer circumference between said housing and a spacer ring, said guide diaphragm including a central aperture that surrounds said bearing tube retainer and a mid-portion that forms an annular guide zone upon which said annular guide ring of said armature rests, said guide diaphragm forming a centering element for said bearing tube retainer and said armature, a spherical pivot segment pivotably supported in said bearing tube retainer remote from said spherical sealing segment with said spherical pivot segment firmly joined to said cylindrical elongation segment of said valve member.

2. An electromagnetically actuatable valve, as defined by claim 1, further wherein said elongation segment of said valve member is tubular in embodiment.

3. An electromagnetically autuatable valve, as defined by claim 1, further wherein said bearing tube is further arranged to partially surround and engage said pivot segment, and a retainer ring is positioned in said bearing tube upstream from said pivot segment.

* * * * *